(No Model.)
H. BORSCH.
NOSE PIECE FOR EYEGLASSES.
No. 564,501. Patented July 21, 1896.
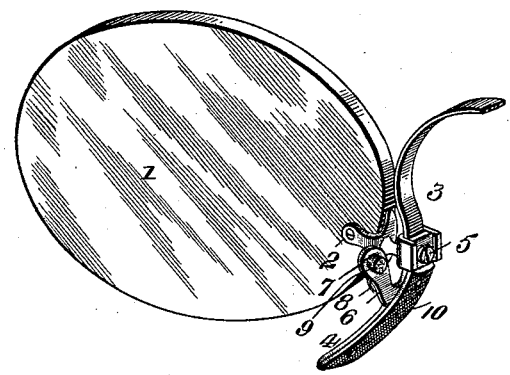
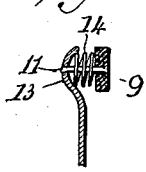
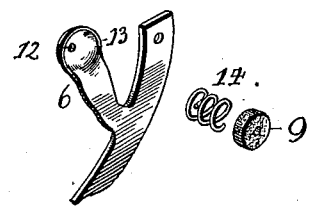
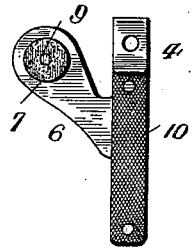
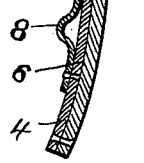
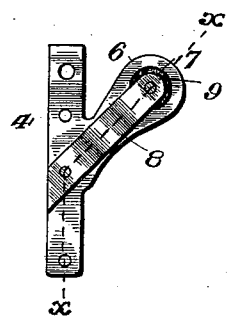
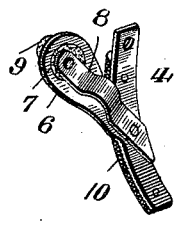
Witnesses
John Imrie
W. E. McDaniel
Inventor
Henry Borsch
By T. J. W. Robertson
Attorney

UNITED STATES PATENT OFFICE.

HENRY BORSCH, OF CHICAGO, ILLINOIS.

NOSE-PIECE FOR EYEGLASSES.

SPECIFICATION forming part of Letters Patent No. 564,501, dated July 21, 1896.

Application filed December 7, 1895. Serial No. 571,432. (No model.)

*To all whom it may concern:*

Be it known that I, HENRY BORSCH, a citizen of the United States, residing at Chicago, in the county of Cook and State of Illinois, have invented a certain new and useful Improvement in Nose-Pieces for Eyeglasses, of which the following is a specification, reference being had to the accompanying drawings.

This improvement relates to that class of nose-pieces which are made with two faces or bearing-surfaces, and is designed to provide eyeglasses with a pair of duplex nose-pieces the lower or main sections of which are substantially rigid, except so far as they can be bent or will yield through the elasticity of the bridge-spring, while the upper or auxiliary sections are very yielding indeed. By this means the eyeglasses can be perfectly fitted to the eyes and nose by bending with pliers or otherwise the parts connecting the nose-piece to the lower sections, so that these will act mainly as guides to keep the eyeglasses in position, while the other sections are made to yieldingly press on the nose independently of the other or main section. With this arrangement of the sections the lower or main ones may be made to rest lightly on the nose by pressing it but little if at all, while the upper section, being held by a spring independently of the lower section, may be arranged to press on the nose with a considerable degree of force, and for this purpose I set the upper or yielding section considerably in advance of the lower or fixed section. By these means a pair of eyeglasses may be held securely on the nose without undue pressure thereon.

To these ends the invention consists in the peculiar construction, combination, and arrangement of parts hereinafter more particularly described, and definitely claimed at the end hereof.

In the accompanying drawings, Figure 1 is a perspective view of part of a pair of eyeglasses provided with my improvement. Fig. 2 is a side view of the nose-piece detached, on a larger scale, and looking in toward the lens. Fig. 3 is a similar view, but looking in the opposite direction. Fig. 4 is a perspective view of the same. Fig. 5 is a section of a modification. Fig. 6 is a perspective view of the parts of the same represented separated. Fig. 7 is a section through the line *x x*, Fig. 3.

Referring now to the details of the drawings by figures, 1 represents the lens, provided with the clasp 2, to which the bridge-spring 3 and stiff carrying-arm or nose-piece support 4 are attached by a screw 5 in the ordinary manner. Extending from and forming part of this carrying-arm or support is an arm 6, which is enlarged and has a perforation 7 at the end. Attached to this carrying-arm or support is a small spring 8, bent substantially as shown, to the outer end of which is secured a bearing-surface 9, of cork or other suitable material, which passes through the perforation 7, the walls of which serve as a guide to keep said bearing-surface in place. On the lower face of the carrying-arm or support is a bearing-surface 10, of hard rubber, celluloid, or similar material, or it may be of soft rubber or cork if preferred. The spring bearing-surface 9 is preferably arranged so as to project slightly beyond the pad 10 toward the nose. By this arrangement I am enabled to provide eyeglasses with nose-pieces each having two pads or bearing-surfaces, one of which is comparatively rigid, while the other is very yielding and is held in position by its connection with the other bearing-surface.

I may sometimes use the construction shown in Figs. 5 and 6, in which the pad is mounted on pin 11, which works through a small hole 12 in the arm 6, the outer end of which is formed into a cup 13, containing a coiled spring 14, which will readily yield under pressure, while the arm forms a guide to retain it in place. I should consider this as a substantial equivalent of the construction shown in the other figures, as the arm 6 forms a guide for the pin 11, and as the pad is attached to said pin it forms a guide for that also, and the spring, although of different form, acts to press the pad upon the nose in substantially the same way as the spring in the other figures.

In another application, filed by me on November 1, 1895, and numbered serially 567,648, I have shown and described a nose-piece having two independent sections substantially in line with each other, one of which is more yielding than the other; but the following claims are not limited to the main and supplemental bearing-surfaces being "substantially in line with each other," as they are broad enough to cover a nose-piece having the main and supplemental bearing-surfaces supported as described, and having the supplemental bearing-surface overlapping or projecting beyond the main bearing-surface, whether said bearing-surfaces are substantially in line with each other or not.

What I claim as new is—

1. The combination in a pair of glasses, of a stiff carrying-arm rigidly supporting a main bearing-surface and having a spring secured thereto, and a second or supplemental bearing-surface secured to said spring and overlapping or projecting beyond said main bearing-surface toward the nose, substantially as described.

2. The combination in a pair of glasses, of a stiff carrying-arm rigidly supporting a main bearing-surface and having a spring secured thereto, and a second or supplemental bearing-surface acted on by said spring and coacting with said main bearing-surface and overlapping or projecting beyond the same toward the nose, the said supplemental spring bearing-surface being thus very resilient compared with the main bearing-surface, substantially as described.

3. The combination in a pair of glasses, of a stiff carrying-arm rigidly supporting a main bearing-surface and having a light spring carried thereby, a supplemental bearing-surface carried by said spring and coacting with and overlapping or projecting beyond said main bearing-surface toward the nose and working through a guide in the same, substantially as described.

In testimony whereof I affix my signature, in the presence of two witnesses, this 30th day of November, 1895.

HENRY BORSCH.

Witnesses:
 CHARLES WEYHMAN,
 C. GILKEY.